United States Patent [19]

Pottschmidt

[11] Patent Number: 4,745,644
[45] Date of Patent: May 24, 1988

[54] LOCKING SLAT BED FRAME

[75] Inventor: Paul E. Pottschmidt, Lexington, N.C.

[73] Assignee: Leggett & Platt, Incorporated, Carthage, Mo.

[21] Appl. No.: 33,993

[22] Filed: Apr. 1, 1987

[51] Int. Cl.⁴ .............................................. A47C 19/00
[52] U.S. Cl. ...................................... 5/200 C; 5/201; 5/238; 5/285; 403/254
[58] Field of Search ............... 5/131, 200 R, 200 C, 5/201, 207, 236 R, 238, 285, 305; 403/254, 255

[56] References Cited

U.S. PATENT DOCUMENTS

| | | |
|---|---|---|
| 207,776 | 9/1878 | Roswell .................................. 5/238 |
| 397,708 | 2/1889 | Fernau . |
| 414,292 | 11/1889 | Clevett . |
| 598,454 | 2/1898 | Weaver, Jr. . |
| 612,056 | 10/1898 | Reynolds et al. . |
| 682,386 | 9/1901 | Oblosser . |
| 736,569 | 8/1903 | Webb ..................................... 5/238 |
| 779,027 | 1/1905 | Coburn .................................. 5/238 |
| 984,823 | 2/1911 | Linden . |
| 1,008,720 | 11/1911 | Knape . |
| 1,108,515 | 8/1914 | Laden ..................................... 5/238 |
| 2,983,931 | 5/1961 | Nelson . |
| 3,713,181 | 1/1973 | Hougland . |
| 4,133,433 | 1/1979 | Wolf ................................ 403/255 X |
| 4,324,379 | 4/1982 | Ovitz, III . |
| 4,387,872 | 6/1983 | Hogne . |
| 4,494,896 | 1/1985 | DiFranco . |

Primary Examiner—Alexander Grosz
Assistant Examiner—Michael F. Trettle
Attorney, Agent, or Firm—Wood, Herron & Evans

[57] ABSTRACT

A bed frame having slats which connect and disconnect from the side rails of the frame through a pair of mutually perpendicular motions to prevent inadvertent disconnection. The slats are provided with vertical tabs at their ends which fit into vertical holes in the upper surfaces of flanges on the rails. A lock is provided which slides horizontally in the slat to engage and disengage a horizontal hole in the inner edge of the rail flange. A spring applies force to resist unwanted movement of the lock on the slat.

14 Claims, 2 Drawing Sheets

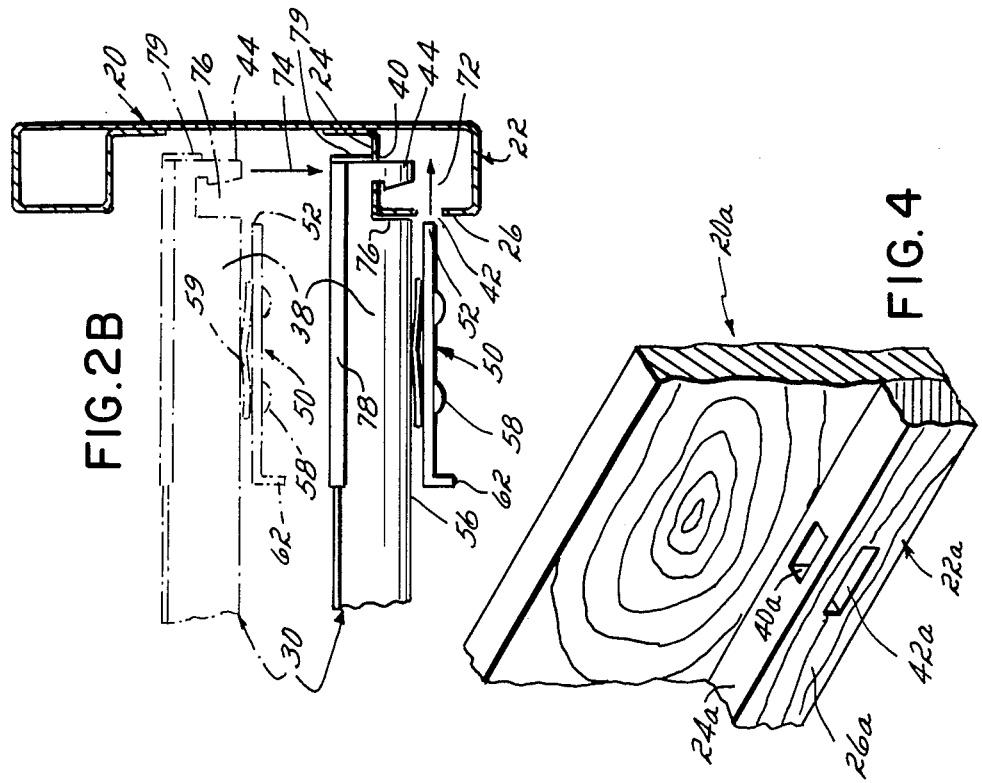
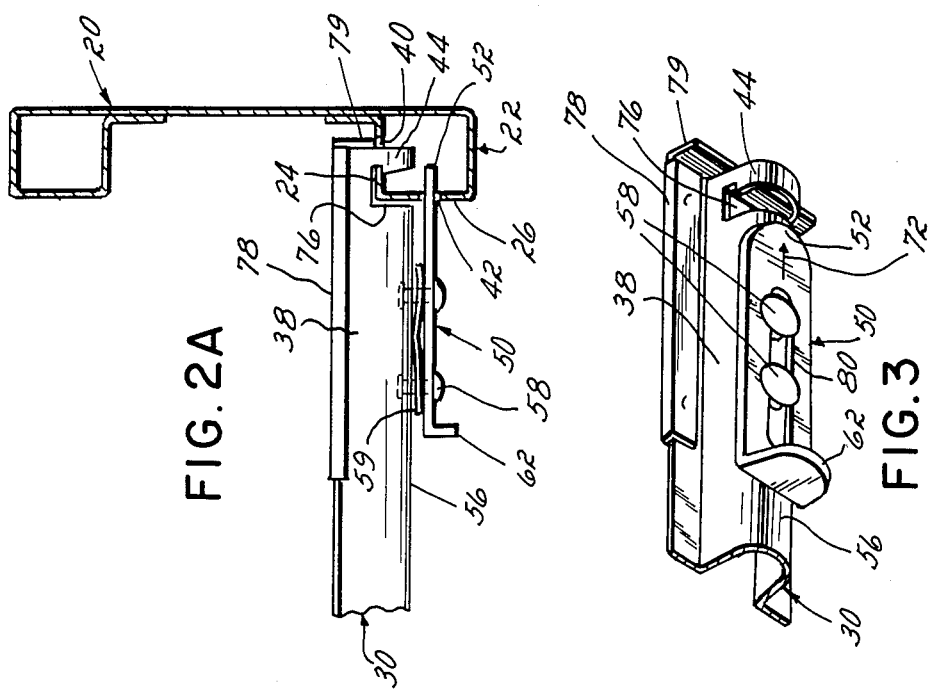

LOCKING SLAT BED FRAME

The present invention relates to bed frames and more particularly, to interconnecting bed frame slat and the side rail combinations.

Bed frames are characteristically comprised of a headboard, a footboard and a pair of interconnecting side rails which are rigidly secured to the opposite sides of the headboards and footboards to form a rectangular frame for supporting a rectangular mattress and bed spring. The side rails are often wide in their vertical cross section to stiffen the frame and surround the bedding material which is set down into the frame. Commonly, the inner surfaces of the side rails carry a ledge or flange which presents an upper horizontal surface to support the ends of bed slats. The bed slats transversely span the rectangular frame from side rail to side rail to support the bedding.

Traditionally, in the assembly of the bed, the slats are lowered vertically downward onto the upper surfaces of the flanges of the rails and then held in position by the weight of the spring and mattress. In the prior art, this fundamental method has been improved upon by the provision of slots or notches along the rail flanges into which components on the ends of the slats are inserted to prevent the slats from sliding longitudinally or falling from the rails. Prior art designs have employed vertical tabs at the ends of the slats and projecting downwardly to be inserted into grooves along the tops of the rail flanges or to hook over the rails to prevent the inadvertent removal of the slats. Such designs, however, still rely upon the weight of the supported bedding load to hold the slats in place. With these designs, movement of the bed or of the frame can still cause the slats to disconnect from the rails.

Some other prior art designs have resorted to various ties, latches and locking hooks to hold the slats to the rails. These prior art devices are often complex mechanisms which are retrofitted to conventional slat and rail combinations to achieve the locking characteristic. These devices lack simplicity of construction and ease of use.

It is an objective of the present invention to provide a bed frame having a safety slat which locks to the wide side rails of the bed frame in a manner which prevents the inadvertent disengagement of the slat from the rail. More particularly, it is an objective of the present invention to provide a bed frame with a locking slat and rail combination which requires a pair of distinct manual motions to unlock and remove the slat from the rail.

It is a further objective of the present invention to provide a locking slat and rail combination in which the connecting means can be easily and economically fabricated, in part on the ends of sheet metal slats, and in part on the inner surfaces of either wood or sheet metal side rails of the bed frame.

According to the principles of the present invention, a bed frame is provided with a locking connection between the bed slats and the side rail which requires two motions, one horizontal and one vertical, to disengage the slat from the rail. The vertical motion is required to disengage a downwardly facing tab provided at the end of the slat from a vertical hole provided in the upper surface of the supporting flange of the rail. This motion is only possible, however, after the slat is unlocked from the rail by a horizontal movement of a locking member provided at the slat and rail connection. To unlock the slat from the rail, the horizontal motion is required to withdraw the tip of the locking member, which is movably mounted on the slat, from a transverse hole provided in the inner edge of the rail flange.

Preferably, according to the preferred embodiment of the invention, the lock is slidably mounted to the lower surface of the slat and is provided with means to resist the unintended movement of the lock from the hole in the rail. This means is preferably provided by a leaf spring to increase the frictional force between the lock and the slat to provide resistance to the unwanted motion. In this arrangement, the lock moves only when pushed either into or out of engagement with the locking transverse hole in the rail.

The rail to which the invention is particularly applicable is the wide side rail of the type having a vertically elongated cross section to stiffen the bed frame to better support the weight of the bedding load. This rail may be made of wood with the slat supporting flange in the form of a ledge on the inner surface of the rail near its lower edge. The rail may also be formed of sheet metal with a lower flange formed of the sheet metal rail to support the slats. Often, an upper flange is also formed of the sheet metal to stiffen and strengthen the rail. The lower flange is more suitable for support of the bed slats so that the spring and mattress may be set within the frame.

In accordance with the present invention, the preferred embodiment more specifically provides a rail and slat connection carried in part by the slat in the form of the downwardly facing fixed tab and in the form of the movable horizontal lock. The rail and slat connection is also carried in part by the rail flange in the form of perpendicular holes, one horizontal and one vertical, and preferably intersecting, of the rail. Operation of the lock requires horizontal motion, and removal and replacement of the unlocked slat requires vertical motion.

These and other objectives and advantages of the present invention will be more readily apparent from the following detailed description of the drawings in which:

FIG. 2A is a cross-sectional view of the side rail of the bed frame along line 2A—2A of FIG. 1 and showing a bed slat locked to a sheet metal side rail.

FIG. 2B is a view similar to FIG. 2A but showing the slat positioned on the rail with a locking member disengaged, and further showing in phantom the slat removed from the rail.

FIG. 3 is a perspective view of the end of the slat shown in FIG. 2.

FIG. 4 is a sectional perspective view of a side rail of the embodiment in which the rail is formed of wood.

Figure 1:
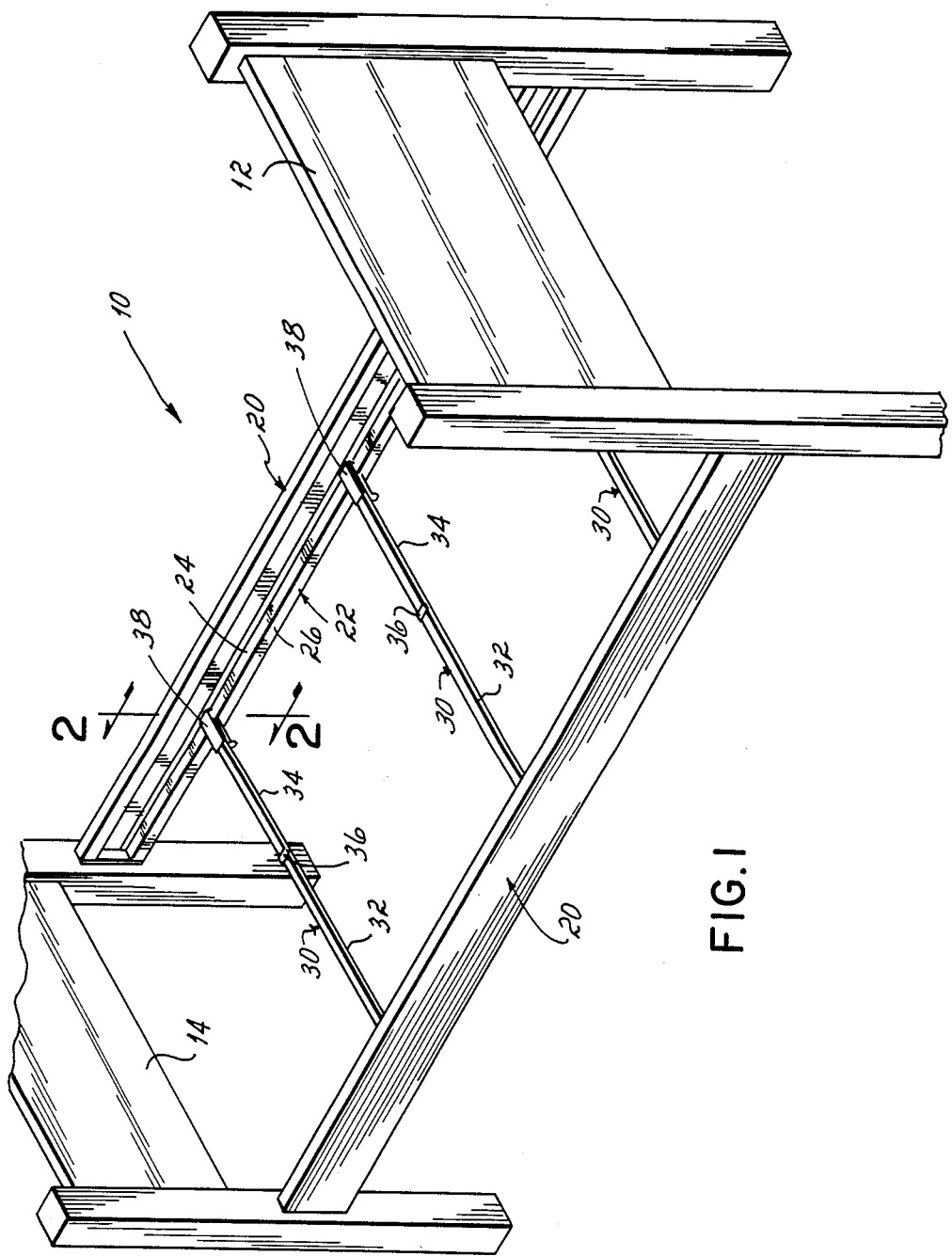
FIG. 1 is a perspective view of a bed frame with the locking slat and rail combination according to principles of the present invention.

Referring to FIG. 1, a bed frame 10 is illustrated having a headboard 12, a footboard 14, and a pair of side rails 20 extending parallel to each other and longitudinally connecting the headboard 12 with the footboard 14 and rigidly mounted thereto at each side, thereby defining the rectangular bed frame. The side rails 20 are of the wide side rail type which provide the stiffening of the bed frame against bending when a bedding load is supported along the length of the rails.

The rails 20 may be manufactured of either wood or sheet metal. In either case, the rail 20 will be provided with a flange 22 on the inwardly facing surface of the rail 20. With a wooden rail 20 (FIG. 4), the flange 22a will be typically in the form of a ledge board secured along the inner lower edge of the rail 20. Where the rail 20 is of sheet metal construction, the lower flange will be formed, shown here as a closed rectangular channel, on the inner surface of the rail 20 at its lower edge. The flange 22 has an upwardly facing horizontal load bearing surface or wall 24 and an inwardly facing vertical surface or wall 26.

A bedding load will be supported on the rails 20 by a plurality of transverse slats 30 which extend between the two rails 20, resting at their ends on the upwardly facing surfaces 24 of the flanges 22. In the illustrated embodiment, the slats 30 are each commonly formed of sheet metal and are made in two telescoping parts 32 and 34. The parts telescope within each other and are held in engagement by a clamp 36 so that the slat 30 will be of variable length to accommodate various rail spacings for bed frames 10 of various widths.

The slats 30 are locked into engagement with the rails 20 at the end 38 of the slat 30. The portion of the rail and slat connection which is carried by the slat and its interrelation with the portion carried by rail 20 is more clearly seen by reference to FIG. 2A.

Referring to FIGS. 2A and 2B, the rail 20 is shown in cross section, being illustrated as of the sheet metal type. The rail 20 has at its lower edge the flange 22 formed as a closed channel facing inwardly of the rail at its lower edge. The flange 22 is rectangular in shape and defines an upwardly facing horizontal surface or wall 24 and an inwardly facing vertical surface or wall 26.

Formed in the upper surface or wall 24 of the rail 22 is a downwardly extending vertical hole 40. The vertical hole 40 extends through the upwardly facing surface 24 of the flange 22 and is shaped in cross section as a longitudinal slot. A similar transversely extending, horizontal hole 42 extends through the inwardly facing vertical surface 26 and is also shaped in cross section as a longitudinal slot.

The slat 30 is shown with its end 38 in engagement with and supported by the rail flange 22. The slat end 38 has formed therein a downwardly facing tab 44 shown extending into the vertical hole 40 in the upwardly facing surface 24 of the flange 22. In this position, the slat 30 is locked to the rail 22 against movement in all but the vertically upward direction, and thus it will not move from the rail provided that substantial weight is bearing downward upon the slat 30, and the bed frame 10 is not being moved.

Slidably mounted to the bottom of the slat 30 near the slat end 38 is a slidable sheet metal lock 50. The lock 50 has a locking tip 52 which is shaped to fit into the transverse hole 42 in the inwardly facing vertical surface or wall 26 of the flange 22. The lock 50, in the illustrated embodiment, is slidably mounted to the lower surface 56 of the slat 30 by a pair of rivets 58 which extend through a slot 80 in lock 50. The slidable lock 50 is held into position by a leaf spring 59 compressed between the lock 50 and the lower surface 56 of the slat 30. The spring 59 increases the frictional force between the lock 50 and the lower surface 56 of the slat 30.

The inner end of the lock 50 is formed into a hook 62 so that it can be engaged by hand to push the lock to and from its extended position, as illustrated in FIG. 2A. In this extended position, the lock tip 52 is within the hole 42 of the flange 22, locking the slat 30 to the rail 20. The retracted position is illustrated in FIG. 2B.

Referring to FIG. 2B, the rail 20 is shown with the slat 30 supported on the flange 22 of the rail 20, and with the lock 50 in the disengaged retracted position with its tip 52 withdrawn from the transverse hole 42 in the inwardly facing wall 26 of the flange 22. As can be appreciated from FIG. 2B, the locking and unlocking motion of the lock 50 is in the horizontal transverse direction as shown by the arrow 72. This motion is accomplished by manually pushing of the lock 50 at a lock handle 62 on the opposite end of the lock 50 opposite the locking tip 52. With the lock 50 in the unlocked or retracted position shown in FIG. 2B, the slats 30 can be disengaged from the rail 20 by movement in the vertically upward direction, perpendicular to the unlocking motion of the lock 50. This vertical motion inserts and withdraws the tab 44 into and from the hole 40 in the upwardly facing surface 24 of the flange 22. The slat 30 as shown in phantom in FIG. 2B represents the position of the slat 30 removed from the rail 20 and positioned just before or after the vertical motion for connection to or disconnection from the rail 20. The vertical motion for connection of the slat 30 to the rail 20 is shown by the arrow 74 representing the path of the tab 44 upon insertion into the vertical hole 40. The provision of the two perpendicular motions represented by the arrows 72 and 74 for removing the slat 30 from the rail flange 22 significantly reduce the likelihood of inadvertent or accidental disconnection of the slat 30 from the rail 20.

The construction of the slat end 38 of the slat 30 can be more fully appreciated by reference also to FIG. 3 which sows the slat 30 formed of a sheet metal channel into which a notch 76 is cut in the underside 56 of the slat 30 near its end. This notch 76 defines the vertical tab 44 at the end of the slat 30. A sheet metal reinforcement piece 78 having a downwardly bent end tab 79 is stamped and crimped onto the end 38 of the slat 30.

The slidable connection of the lock 50 is also further illustrated in FIG. 3. The transversely movable lock 50 is slidably secured to the underside 56 of the slat 30 by the pair of transversely spaced rivets 58, each rigidly secured to the underside 56 of the slat 30 and both extending through a single transverse slot 80 in the lock 50. Secured in this manner, the lock 50 is slidable in the direction of the arrow 72 between its retracted and extended positions for releasing and locking the slat 30 and the rail 20.

FIG. 4 illustrates a portion of a rail 20a of alternative wooden construction on which the flange 22a is a wooden ledge or board rigidly secured to the inner surface of the rail at the lower edge of the rail 20a. As with the metal version, the flange 22a presents an inwardly facing vertical surface 26a and upwardly facing horizontal load supporting surface 24a. The vertical and transverse holes 40a and 42a, respectively, are formed in the surfaces 24a and 26a. The holes so configured intersect at right angles. The wooden rail 20a of FIG. 4 functions in the same way as does the metal rail 20 illustrated in FIGS. 1–3.

Having described the invention, what is claimed is the following:

1. A bed frame having a headboard, a footboard, and a pair of wide longitudinal side rails extending therebetween parallel to each other and connecting said boards together to define a rectangular bed frame, said bed frame comprising:

an inwardly facing flange formed on at least one of said side rails, said flange having an inner vertical edge and having an upwardly facing surface adapted to support the end of a slat, a transverse slat having an end supported upon the upwardly facing surface of said flange, the upwardly facing surface of said flange having a vertical hole therein, and the inner vertical edge of said flange having a transverse hole therein, a downwardly facing tab formed at said end of said slat and configured to fit into said vertical hole when said slat is supported by said rail, said tab being inserted vertically into said vertical hole when said slat is assembled onto said rail, and a lock mounted on said slat near said end and being transversely movable between a retracted and an extended position, said lock having a tip configured to fit, when said lock is in said extended position, into said transverse hole to prevent the upward movement of said slat from said rail, said lock being inserted horizontally into said transverse hole to lock said slat onto said rail.

2. The bed frame of claim 1 which further comprises a compression element connected between said supported slat and said lock to forceably resist the movement of said lock from said extended position to said retracted position.

3. The bed frame of claim 1 wherein said flange is formed along a lower edge of said side rails to support slats below the upper edge of said rails.

4. The bed frame of claim 3 wherein said lock is slidably mounted to the lower surface of said slat, and said compression element is connected so as to frictionally resist movement of said lock in either direction.

5. The bed frame of claim 1 wherein said wide side rail is formed of sheet metal and said flange is formed integrally of the sheet metal of said rail.

6. The bed frame of claim 1 wherein said wide side rail and said flange is formed of wood.

7. The bed frame of claim 6 wherein said vertical hole is located so as to intersect with said horizontal hole in said flange.

8. A bed frame having a headborad, a footboard, a pair of wide longitudinal side rails extending therebetween and parallel to each other and connecting the boards to define a rectangular bed frame, each of said side rails having an inwardly facing lower flange, both flanges lying in the same horizontal plane, said flame having a plurality of transverse slats supported at their ends upon the upper surfaces of said side rail flanges, and said ends of said supported slats being locked to the supporting rail by the combination wherein:

each of the flanges of said supporting rails has a first vertical hole in an upper horizontal surface of said flange and has a second transverse hole in an inwardly facing vertical surface, each of said supported slats has at its ends a downwardly facing tab configured to fit into said vertical holes when said slat is supported by said flanges of said supporting rails, said tab being inserted vertically into said vertical hole when said slat is assembled onto said rail, and a lock slidably mounted on each end of each of said slats, said lock being movable when pushed between a retracted and an extended position, said lock having a tip configured to fit, when said lock is in said extended position, into one of said transverse holes in one of said flanges to lock said supported slat to said supporting rail, said lock being inserted horizontally into said transverse hole to lock said slat onto said rail.

9. The bed frame of claim 8 wherein a compression element is connected between said supported slat and said lock to maintain said lock in the extended position engaged with said flange.

10. The bed frame of claim 9 wherein said compression element includes a leaf spring compressed between said slat and said lock.

11. The bed frame of claim 8 wherein each of said slats has a lower surface and wherein said lock is slidably mounted to the lower surface of the slat upon which it is mounted.

12. The bed frame of claim 11 wherein said lock is connected by rivets to said lower surface.

13. In a bed frame, the improvement for locking a bed slat to the frame comprising:

a side rail having a pair of holes therein, one perpendicular to the other, means at the end of the slat insertable into and removable from one of said holes by movement in only a first direction, a lock connected to the end of the slat and movable with respect to the slat in a second direction perpendicular to the first and into and out of the other one of said holes.

14. The improvement of claim 13 wherein the first direction is vertical and the second direction is transverse.

* * * * *